United States Patent [19]
Brewer et al.

[11] Patent Number: 5,609,065
[45] Date of Patent: Mar. 11, 1997

[54] CABLE ACTUATOR ASSEMBLY

[75] Inventors: James D. Brewer, Cary; Alan A. Davidovich, Garner, both of N.C.

[73] Assignee: Caterpillar Inc., Peoria, Ill.

[21] Appl. No.: 469,402

[22] Filed: Jun. 6, 1995

[51] Int. Cl.$^6$ ................................................ G05G 5/06
[52] U.S. Cl. .......................... 74/528; 74/473 R; 74/526; 74/501.6
[58] Field of Search .................. 74/500.5, 501.5 R, 74/502.4, 491, 522, 525, 526, 523, 528, 502.6, 502.2, 473 R, 512, 480 B, 469, 471 R

[56] References Cited

U.S. PATENT DOCUMENTS

| | | | |
|---|---|---|---|
| 1,255,220 | 2/1918 | Petry | 74/512 |
| 1,582,378 | 4/1926 | Brueckmann | |
| 2,542,423 | 2/1951 | Metzger | 74/501 |
| 3,322,092 | 5/1967 | Landon | 74/480 B |
| 3,530,736 | 9/1970 | Houk | 74/469 |
| 3,736,800 | 6/1973 | Gregory | 74/491 |
| 4,020,713 | 5/1977 | Cantley et al. | 74/479 |
| 5,205,181 | 4/1993 | Wright | 74/480 R |
| 5,431,255 | 7/1995 | Tsuchie | 74/471 R X |
| 5,462,146 | 10/1995 | Doolittle et al. | 74/473 R X |

*Primary Examiner*—Vinh T. Luong
*Attorney, Agent, or Firm*—Claude F. White; Diana L. Charlton

[57] ABSTRACT

An assembly for actuating a cable, and a release mechanism connected to one end of the cable, includes a substantially flat plate with first and second connecting portions bent at a right angle to the plate. The plate has a plurality of through holes and threaded devices which are used to connect the plate to a wall portion of a machine. An actuating lever is connected to the center portion of the plate and a cable assembly is connected to one of the connecting portions with a cable connected to the actuating lever. The actuating assembly is adapted to move the cable for releasing a latch mechanism from a position remote from the latch mechanism. The latch mechanism holds a door of a machine in an open position and the actuating assembly releases the latch mechanism from ground level without having to enter the machine.

7 Claims, 2 Drawing Sheets

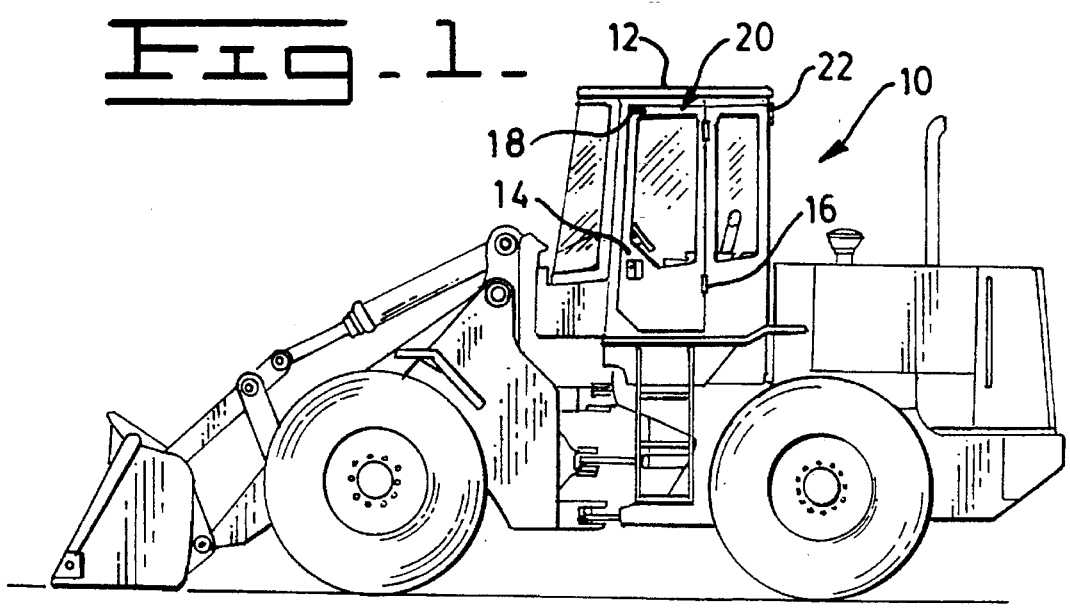
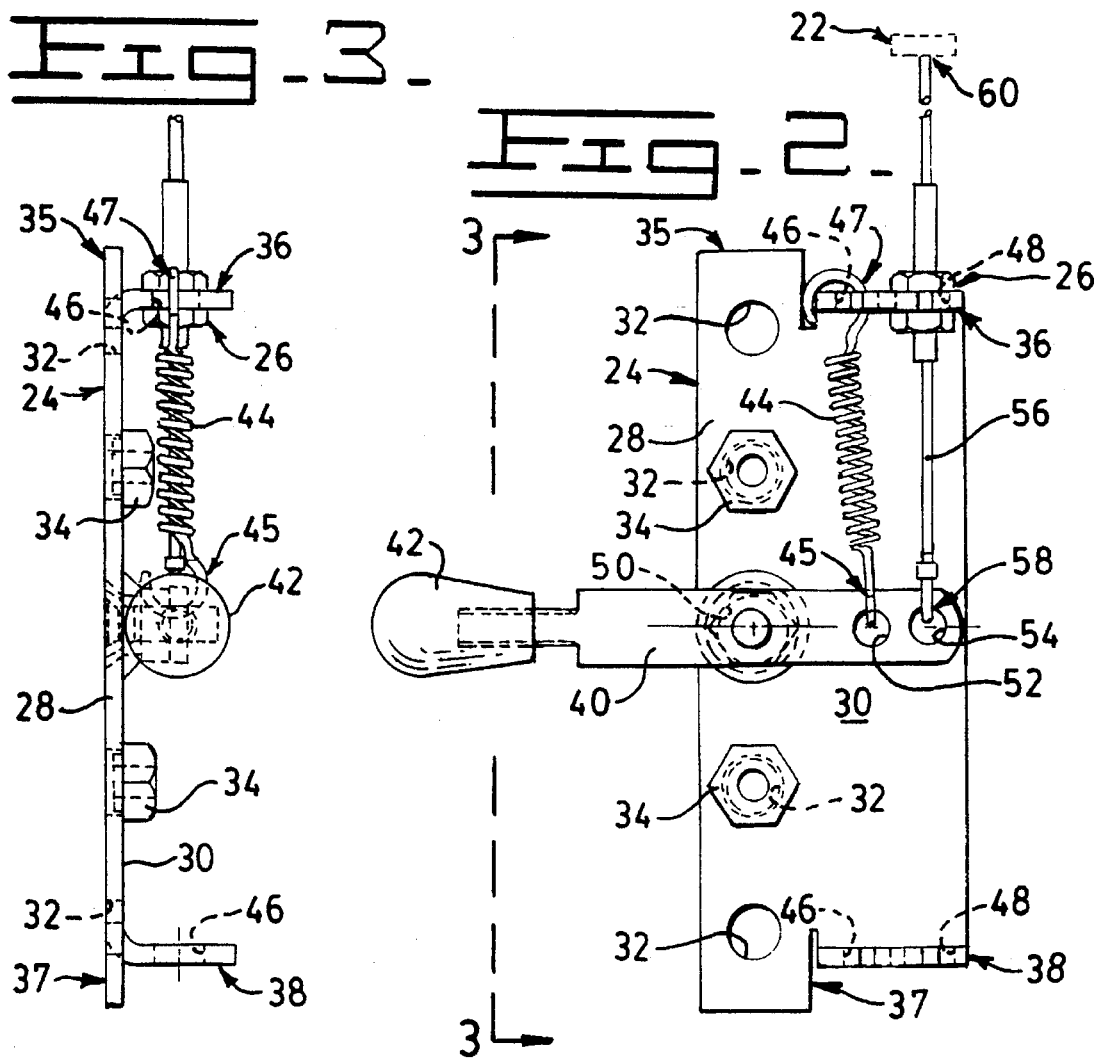

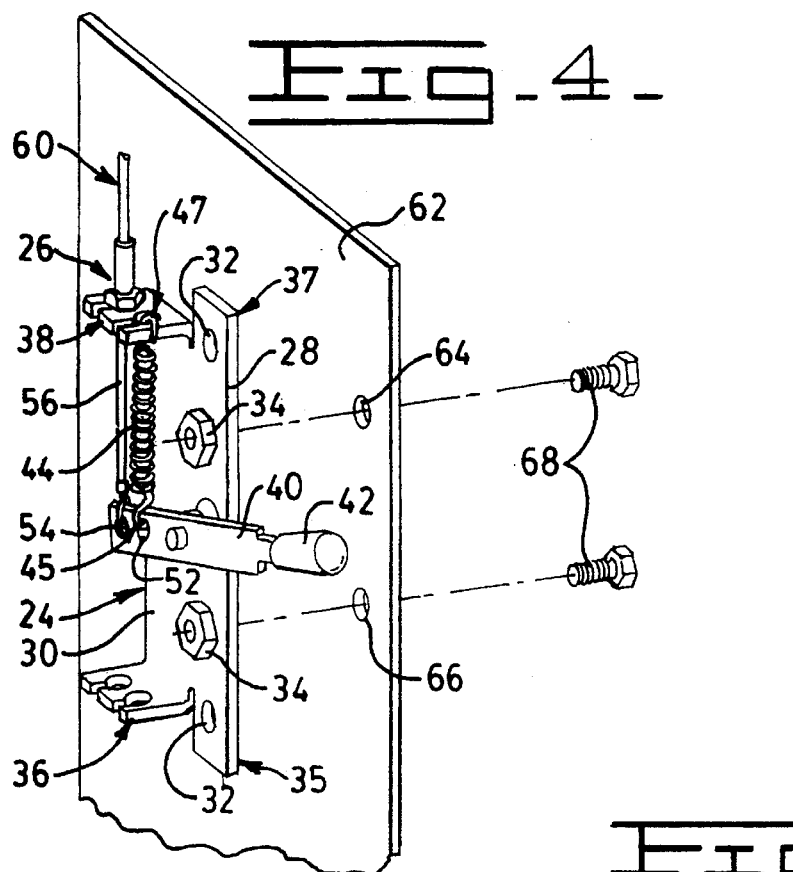
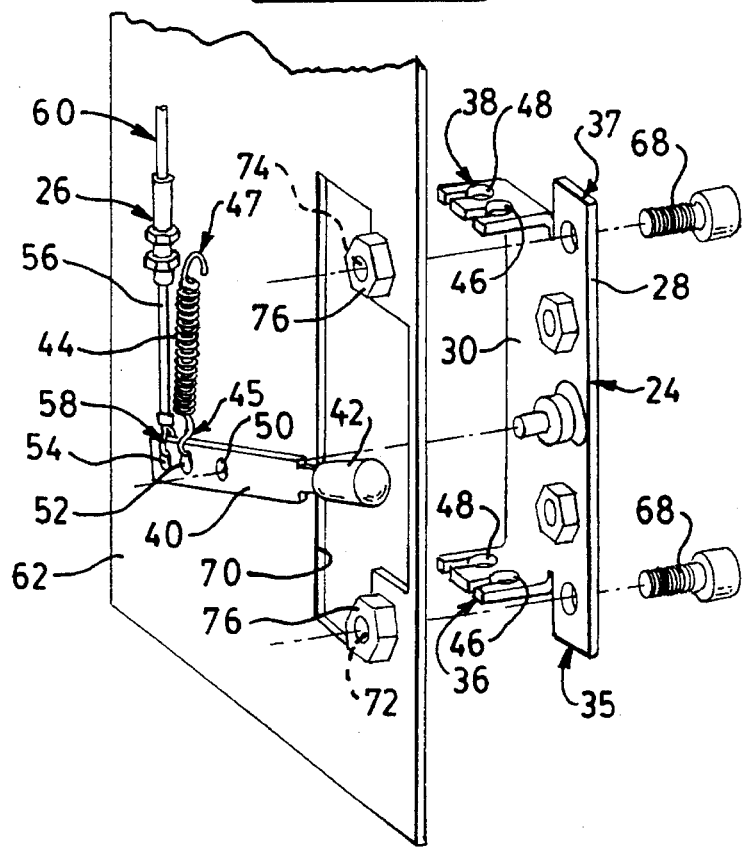

1
CABLE ACTUATOR ASSEMBLY

TECHNICAL FIELD

This invention relates generally to an assembly for actuating a cable and more particularly to such an assembly which releases a latch mechanism from a remote position.

BACKGROUND ART

Earthmoving and construction machines, such as wheel and track type loading machines and backhoe loading machines, are often equipped with enclosed operator's stations, or cabs. Such cabs include one or two doors for entering and exiting. The cabs generally include a latching mechanism for holding the door in an open position to provide ventilation and an unobstructed view to the exterior of the cab.

When the machine operator exits the machine, for any number of reasons, the door is often in the open, latched position. Once the operator is off of the machine, he may decide not to re-enter the machine for some time and desire to close the door from its latched position. In the prior art machines, the operator must climb back on the machine, and into the cab, in order to release the hold-open latch mechanism. The operator must then climb back off of the machine, closing the door as he exits. This causes the operator additional time and effort.

The present invention is directed to overcoming one or more of the problems as set forth above.

DISCLOSURE OF THE INVENTION

In one aspect of the present invention, an assembly for actuating a cable includes a plate having a substantially flat planar surface and first and second connecting portions which are bent to form a substantially right angle to the planar surface. A lever is pivotally connected to the plate about midway between the connecting portions. The assembly is adapted to be connected to a wall portion of a machine and one end of a cable assembly is adapted to be connected to the actuating assembly. The other end of the cable is adapted to be connected to a latch mechanism which holds a door of the machine in a hold-open position. The subject cable actuator assembly provides releasing of the latch mechanism from a ground level position remote from the operator's station. The machine operator is not required to reenter the operator's station, once he has exited the machine, to release the door from the hold-open position. The present invention also serves to release the latch mechanism for an operator seated inside the operator's station.

BRIEF DESCRIPTION OF THE DRAWINGS

FIG. 1 is a diagrammatic side elevational view of a machine which incorporates the subject invention;

FIG. 2 is a diagrammatic front elevational view of the subject cable actuator assembly;

FIG. 3 is a diagrammatic side elevational view of the subject invention, taken generally along the lines 3—3 of FIG. 2;

FIG. 4 is a diagrammatic perspective view of the subject invention and a portion of a machine wall; and FIG. 5 is a diagrammatic perspective view similar to FIG. 4 and showing an alternate method of mounting the cable actuator assembly to a machine wall.

2
BEST MODE OF CARRYING OUT THE INVENTION

With reference to the drawings, a work machine, such as a wheel loader machine 10, has an operator's station 12, including an access door 14. The door 14 is adapted to open and rotate about a hinge 16 to a position about 180° from the closed position. At this open position, a pin 18 connected to the upper portion 20 of the door 14 engages a hold-open latch mechanism 22 connected to the operator's station 12. The latch mechanism 22 holds the door 14 in a hold-open position until the latch mechanism 22 is released.

A cable actuator assembly 24 for actuating a cable device 26 for releasing the hold-open latch mechanism 22 is positioned within the operator's station 12. The actuator assembly 24 includes a plate 28 having a substantially flat planar surface 30 and a plurality of through holes 32. The plate 28 is adapted to be connected to the machine 10 at a position remote from the hold-open latch mechanism 22. A plurality of threaded devices 34, such as weld nuts 34, are secured to the plate 28 in axial alignment with selected ones of the through holes 32. The plate 28 includes first and second end portions 35,37 which have respective first and second connecting portions 36,38. The connecting portions 36,38 are bent at an angle to the plate 28 to form a substantially right angle to the planar surface 30. The first connecting portion 36 is, therefore, substantially parallel to the second connecting portion 38. An actuating lever 40 having a handle portion 42 is pivotally secured to the plate 28 substantially midway between the first and second connecting portions 36,38. An optional spring 44 may be provided and has a first end portion 45 which is adapted to be connected to the lever 40 and a second end portion 47 which is adapted to be connected to one of the first and second connecting portions 36,38. The spring 44 is adapted to return the lever 40 to its central position after the lever 40 has been actuated to release the latch mechanism 22. The spring 44 is provided to assist a spring in the latch mechanism 22 in the event the latch mechanism 22 or cable device 26 should bind for any reason.

Each of the first and second connecting portions 36,38 has at least two through holes 46,48, with the axis of each hole 46,48 being substantially parallel to the planar surface 30 of the plate 28. Each of the holes 46,48 in the first connecting portion 36 are in substantial axial alignment with one of the holes 46,48 in the second connecting portion 38. The lever 40 is adapted to be spaced from the planar surface 30 of the plate 28 and has a mounting hole 50 and first and second cable receiving holes 52,54. The first cable receiving hole 52 is in substantial axial alignment with one of the through holes 46 in the first and second connecting portions 36,38 and the second cable receiving hole 54 is in substantial axial alignment with the other through holes 48 in the first and second connecting portions 36,38.

The cable device 26 includes a cable 56 having a first end portion 58 connectable to the lever 40 and a second end portion 60 connectable to the latch mechanism 22. The cable device 26 is adapted to be connected into one of the through holes 46,48 of the first or second connecting portions 36,38. The first end portion 35 is substantially similar to the second end portion 37 so the cable actuator assembly 24 can be rotated and used on either side of the machine 10. The cable device 26 can be connected into either of the holes 46 or 48 in order to adjust the mechanical advantage of the cable 56 on the latch mechanism 22. The spring 44 is connectable into the other one of the holes 46,48 which the cable device 26 is not connected into. The spring 44 and the cable device 26 are, therefore, interchangeable in their positions between the lever 40 and the first and second connecting portions 36,38. The first end portion 58 of the cable 56 is of course connected to the lever 40 in either hole 52 or 54 which aligns with the cable device 26 connected into either hole 46 or 48.

The machine 10 has a wall portion 62 and the cable actuator assembly 24 can be connected to the wall portion 62 by two separate arrangements. In the first arrangement, shown generally by FIG. 4, the wall portion 62 has a plurality of mounting holes 64,66 and the plate 28 of the assembly 24 is connected against the wall portion 62 by threaded fasteners 68. The threaded fasteners 68 extend through the mounting holes 64,66 and engage the threaded devices 34 on the cable actuator assembly 24. In the second arrangement, shown generally by FIG. 5, the wall portion 62 has an opening 70 therethrough and a plurality of mounting holes 72,74 adjacent the opening 70. A threaded device 76, such as a weld nut 76, is secured to the wall portion in axial alignment with each of the mounting holes 72,74. The plate 28 is positioned within the opening 70 and is connected to the wall portion by threaded fasteners 68 which extend through the holes 32 in the plate 28 and engage the threaded devices 76.

Industrial Applicability

With further reference to the drawings, and the previous detailed description, the subject cable actuator assembly 24 is particularly useful in construction and earthmoving machines 10 which have an operator's station 12 and an access door 14. In many such machines 10, the access door is held in an open position by a latch mechanism 22 which grips a pin 18 secured to the door 14. The subject cable actuator assembly 24 provides releasing of the pin 18 from the latch mechanism 22 from either inside the operator's station 12, or from a position remote from the operator's station 12, such as at ground level.

After the machine operator has exited the operator's station, the operator reaches inside the open doorway and activates the handle portion 42 of the actuating lever 40. This activates the cable 56, which is connected to the latch mechanism 22, and releases the pin 18 from the latch mechanism 22. The door 14 then swings closed.

Other aspects, objects and advantages of this invention can be obtained from a study of the drawings, the disclosure, and the appended claims.

We claim:

1. A cable actuating assembly, comprising:

a plate having a flat planar surface and a first plurality of through holes, a plurality of threaded devices secured to said plate in axial alignment with selected one of said first through holes, and first and second connecting portions, each connecting portion being bent to form a right angle to said planar surface;

an actuating lever pivotally secured to said plate midway between said connecting portions; and a cable device directly connected to one of said connecting portions and a cable of said cable device directly connected to said lever.

2. The assembly, as set forth in claim 1, wherein each of said first and second connecting portion includes a second plurality of through holes, the axis of each second through hole being parallel to said planar surface.

3. The assembly, as set forth in claim 2, wherein each second through hole in the first connecting portion is in substantial axial alignment with a second through hole in the second connecting portion.

4. The assembly, as set forth in claim 2, wherein said lever is spaced from said planar surface and includes a mounting hole and first and second cable receiving holes, said first cable receiving hole being in substantial alignment with one of said second through holes in said first and second connecting portions, and said second cable receiving hole being in substantial alignment with another one of said second through holes in said first and second connecting portions.

5. The assembly, as set forth in claim 1, including a spring connected between said lever and one of said connecting portions.

6. The assembly, as set forth in claim 1, wherein said plate has first and second end portions and said first and second connecting portions are associated with respective first and second end portions, said first connecting portion being parallel to said second connecting portion.

7. The assembly, as set forth in claim 6, wherein each connecting portion includes a second plurality of through holes with each second through hole in the first connecting portion being in substantial axial alignment with one of said holes in said second connecting portion.

* * * * *